United States Patent Office 3,067,244
Patented Dec. 4, 1962

3,067,244
PROCESS FOR THE PRODUCTION OF DIELS-ALDER ADDUCTS
Robert Robinson, Great Missenden, Bucks, and Gordon Ian Fray, Sandhurst, Camberley, England, assignors to Shell Oil Company, a corporation of Delaware
No Drawing. Filed Mar. 2, 1959, Ser. No. 796,230
Claims priority, application Great Britain Mar. 6, 1958
8 Claims. (Cl. 260—514)

This invention is concerned with the reaction of dienophiles with conjugated dienes to form compounds containing a six-membered carbon ring. In one of its more specific embodiments the invention relates to improvements in the production of substituted cyclohexenes by the catalyzed condensation of dienophiles with conjugated dienes.

The Diels-Alder reaction during the course of which a compound containing a double or triple bond is added to the 1,4-positions of a conjugated diene system with the formation of a six-membered carbon ring, usually an unsaturated ring, is well known and the reaction finds valuable applications in organic syntheses. Thus it is known that butadiene can be reacted with acrolein to produce a reaction mixture containing 3-cyclohexene-1-formyl(tetrahydrobenzaldehyde).

The compound containing a double or triple bond, which advantageously may be activated by additional unsaturation in the alpha beta position, is usually designated a dienophile, which designation is used hereinafter in the specification and attached claims. Reactivity varies appreciably among the numerous dienophiles which have been employed, and in many instances reaction can be promoted only by the use of elevated temperatures and pressures.

It has now been found that the Diels-Alder reaction can be catalyzed in certain cases by specific compounds, so that good yields can be obtained without need to resort to the application of either elevated temperature or pressure, or can be attained at temperatures or pressures lower than those of necessity employed heretofore. Where a Diels-Alder reaction is known to take place at normal temperature and pressure the addition of the catalysts disclosed here can lead to a speedier reaction.

In accordance with the present invention Diels-Alder adducts containing a six-membered carbon ring are prepared by reacting a dienophile containing a terminal vinyl group with a conjugated diene in the presence of a catalyst comprising a member of the group consisting of the halides of aluminum, aluminum-alkyl, iron, zinc, boron, tin titanium, bismuth, antimony and zirconium.

Conjugated dienes reacted with a dienophile in accordance with the present invention comprise organic compounds containing the characteristic grouping

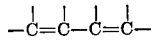

and which do not undergo substantial polymerization under the reaction conditions employed. Such suitable conjugated dienes comprise the conjugated aliphatic diolefins, such as, for example, butadiene and its various homologs, such as isoprene, methylbutadiene (piperylene), 2,3-dimethylbutadiene, 1,3-pentadiene, 2-methylpentadiene-1,3, etc., also cyclopentadiene, anthracene, halogenated derivatives thereof such as, hexachlorocyclopentadiene, hexabromocyclopentadiene, etc.

Dienophiles reacted with conjugated dienes in accordance with the present invention comprise those containing a terminal vinyl group. Preferred dienophiles are compounds having a terminal vinyl group and containing the grouping

wherein $R^1$ represents a member of the group consisting of —H, —OH and alkyl; and $R^2$ represents a member of the group consisting of —H, —COOH and alkyl.

Suitable dienophiles represented by the foregoing Formula I comprise the alpha-beta unsaturated alkanals, alkanones and alkanoic acids and their esters, having a methylene group linked directly to the alpha carbon atom. Thus they include alpha-methylene alkanals represented by the formula

alpha-methylene alkanoic acids represented by the formula:

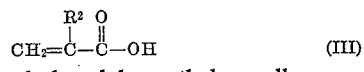

and esters thereof; and the alpha-methylene alkanones represented by the formula:

In the foregoing Formulae II, III and IV, $R^2$ has the same significance as indicated above with respect to foregoing Formula I. In Formula IV the alkyl group attached to the carbonyl carbon atom may comprise, for example, a member of the group consisting of methyl, ethyl, propyl, isopropyl, amyl, isoamyl, etc. Similarly $R^2$ when alkyl may represent, for example, a member of the group consisting of methyl, ethyl, propyl, isopropyl, amyl, isoamyl, etc. Preferred are those compounds wherein the indicated alkyl group attached to the carbonyl carbon atom, and/or $R^2$ when alkyl, consists of a lower alkyl group such as, for example, methyl, ethyl propyl and isopropyl.

Examples of such suitable dienophiles, comprising the alpha-beta unsaturated alkanals, alkanoic acids and alkanonenes having a terminal vinyl group, include acrolein, 2-methyl-2-propenal (methacrolein), 2-ethyl-2-propenal, 2-isopropyl-2-propenal, methyl vinyl ketone, ethyl vinyl ketone, isopropyl vinyl ketone, etc., acrylic acid, methacrylic acid, etc., methylene malonic ester, etc.

Reaction of the conjugated diene with a dienophile in accordance with the invention is carried out in the presence of a catalyst selected from the group consisting of the halides of aluminum, aluminum alkyl, iron, zinc, boron, tin, bismuth titanium, antimony and zirconium. Of these catalysts the chlorides are somewhat preferred. Particularly preferred catalysts comprise titanium tetrachloride, stannic chloride, aluminum trichloride, ferric chloride, zinc chloride and boron trifluoride, as well as aluminum diethyl chloride and aluminum ethyl dichloride. Mixtures of two or more of the catalysts may be used. A particularly effective catalyst comprises the combination of an aluminum ethyl chloride with one of the metal chloride catalysts. For example, the brown precipitate formed by treating a solution of titanium tetrachloride with aluminum diethyl chloride, has been found to be an excellent catalyst in the process of the invention. This brown precipitate contains titanium tri- and tetra-chlorides in admixture with aluminum ethyl chlorides, with possibly some aluminum trichloride. The catalysts may be used as such or combined with a component providing an inert radical thereto, such as an aliphatic ether, for example, ethyl ether. Thus, boron trifluoride is preferably used as the etherate. The suitable catalysts are not necessarily equivalent in their effectiveness under similar conditions. The particular catalyst preferably employed for a specific reaction will depend to some extent upon such factors as the kinetics of the reaction and the specific reactants and catalyst present.

The amount of catalyst used may vary within the scope of the invention. The amount preferably employed will depend to some extent upon specific reactants, catalyst and operating conditions used. The use of the catalyst in an amount ranging, for example, from about 0.005 to about 1.00 mol per mol of dienophile is generally preferred. Greater or lesser amounts of the catalyst may however be used within the scope of the invention.

The catalyst is preferably suspended in an organic solvent which is substantially inert under the conditions of the reaction. Suitable solvents comprise, for example, aromatic hydrocarbons such as benzene, xylene, etc., paraffinic hydrocarbons such as octane, n-hexane, etc.

In carrying out the process of the invention the reactants are brought into contact with one another in the presence of the catalyst. The reactants may be introduced alternately, or simultaneously, into a reactor containing the catalyst. In a suitable method of executing the process the conjugated diene reactant is first admixed with the catalyst, the latter being preferably suspended in a suitable liquid vehicle. The dienophile is thereupon added while agitating the admixture.

Generally the use of substantially atmospheric pressure and room temperature suffices to bring about the obtaining of yields commensurate with practical-scale operation. At times the use of somewhat higher temperatures and/or the use of higher pressures may be desirable. In general, the use of a temperature in the range of for example, from about 20° to about 65° C. and a pressure of from about atmospheric to about 50 p.s.i.g. will be found satisfactory. Somewhat lower or higher temperatures and pressures may, however, be employed within the scope of the invention. Specific temperatures and pressures preferably employed will vary to some extent within the scope of the invention in accordance with the particular reactants and catalysts present. Operating conditions, comprising temperature, pressure and use of suitable solvents are chosen to enable the reaction to proceed substantially in the liquid phase.

Under the above-defined conditions the conjugated diene will react with the dienophile with the formation of a reaction mixture comprising a substituted cyclic alkene having a six-membered carbon ring. Thus when reacting a conjugated aliphatic diolefin with a dienophile of the class set forth above, the reaction mixture obtained will comprise a cycloalkene represented by the general formula:

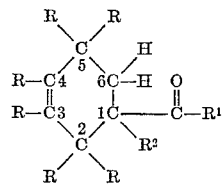

wherein $R^1$ and $R^2$ have the significance indicated above in connection with Formula I and the R's will correspond to the substituents of the conjugated aliphatic diene reactant. Thus when the diene charge consists of butadiene the R's will be hydrogen and the compound will be a substituted cyclohexene wherein $R^1$ and $R^2$ represent the radicals indicated above in connection with Formula I.

When reacting butadiene with acrolein there is obtained 3 - cyclohexene-1-formyl(tetrahydrobenzaldehyde). Similarly when reacting 2,3-dimethylbutadiene with acrolein there is obtained 3,4-dimethyl-3-cyclohexene-1-formyl; 2,3-dimethylbutadiene and methylacrolein yield 1,3,4-trimethyl-3-cyclohexene-1-formyl; butadiene and acrylic acid yield 3-cyclohexene-1-carboxylic acid; butadiene and methyl vinyl ketone yield 1-acetyl-3-cyclohexene-1,2,3,6-tetrahydroacetophenone).

The invention is illustrated by the following examples in which parts are parts by weight unless otherwise stated, and in which the relationship between parts by weight and parts by volume is the same as that between grams and cubic centimeters.

*Example I*

A suspension of the catalyst was prepared as follows: 9.9 parts by volume of aluminum diethyl chloride were added to a stirred solution of 4.4 parts by volume of titanium tetrachloride in 200 parts by volume of isooctane, and the mixture stirred for one hour under an atmosphere of nitrogen. A brown precipitate formed and was allowed to settle, the supernatent liquid being removed through a filter-stock by means of nitrogen pressure. The precipitate was washed with isooctane and finally suspended in 1000 parts by volume of benzene.

Dry butadiene was passed into 100 parts by volume of the above catalyst suspension at room temperature for one hour, with continuous stirring; 4.00 parts by weight of freshly-distilled acrolein were added, the addition taking between 5 and 10 minutes, and the passage of the butadiene into the stirred mixture was continued for a further two hours. Methanol was added to dissolve the precipitate formed during the reaction, and the mixture shaken with water. The resulting emulsion was broken by repeated extraction with ether, and the combined extracts were dried over magnesium sulfate and evaporated. Cyclohex-1-en-4-al was then recovered as a colorless liquid by distillation, the yield being 22% based on acrolein, and the boiling point of the product being between 54° and 57° C. at a pressure of 15 mm. of mercury.

*Example II*

Dry butadiene was passed into a stirred solution of 3.3 parts by weight of stannic chloride in 100 parts by volume of benzene for one hour. 5.0 parts by weight of methyl vinyl ketone were added, and the mixture was stirred for a further one hour, the passage of butadiene being continued. Methanol was added to dissolve the precipitate formed during the reaction, and water added to the resulting mixture. The organic layer separated out and was dried over magnesium sulfate and evaporated. The residue was then distilled to give 4-acetylcyclohex-1-ene as a colorless liquid. The yield was 73% based on the methyl vinyl ketone, and the boiling point of the product was 78° to 79° C. at a pressure of 20 mm. of mercury.

*Example III*

Dry butadiene was passed continuously into a stirred solution of 2.6 parts by weight of titanium tetrachloride in 100 parts by volume of benzene. After one hour 5.1 parts by weight of acrylic acid were added, and the mixture was stirred for a further one hour. The reaction mixture was washed with water, the organic layer containing the product allowed to separate out and then dried over magnesium sulfate and evaporated. Distillation of the residue gave cyclohex-4-enoic acid as a colorless oil. The yield was 44% based on acrylic acid, and the boiling point of the product was 130° to 133° C. at a pressure of 19 mm. of mercury.

*Example IV*

A mixture of 1.4 parts by weight of anthracene, 2.6 parts by weight of titanium tetrachloride in 100 parts by volume of benzene was stirred while 1.1 parts by weight of methyl vinyl ketone were added. The resulting mixture was kept as 40° to 45° C., with stirring, for one hour. Methanol was added to dissolve the solid formed and the mixture washed with water. The organic layer was dried over magnesium sulfate, and evaporated, and the residual viscous oil was mixed with light petroleum (B.P. 40° to 60° C.), a crystalline solid being formed. This solid, on recrystallization from ethanol, gave colorless rhombs of 9:10-(acetylethane) 9:10-dihydroanthracene. The yield was 46% and the melting point of the product was 149.5° to 151° C.

*Example V*

2.6 parts by weight of methyl vinyl ketone were added to a mixture of 3.0 parts by weight of 2:3-dimethyl-butadiene, 4.0 parts by weight of powdered anhydrous zinc chloride and 100 parts by volume of benzene. After the mixture had been stirred for one hour, water was added, the organic layer separated, dried over magnesium sulfate and evaporated. Distillation gave a 16% yield (based on methyl vinyl ketone) of 4-acetyl-1,2-dimethyl-cyclohex-1-ene as a colorless liquid with a boiling point between 109° and 110° C. at 22 mm. pressure.

The invention claimed is:

1. In the process for the production of a substituted cyclohexene wherein a conjugated diene selected from the group consisting of butadienes, cyclopentadiene and hexachlorocyclopentadiene is reacted with an unsaturated dienophile of the formula

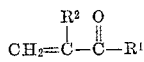

wherein $R^1$ is a member of the group consisting of —H, —OH and lower alkyl and $R^2$ is a member of the group consisting of —H and lower alkyl, the improvement of effecting said reaction at a temperature of from about 20 to about 65° C. in the presence of a catalyst selected from the group consisting of aluminum chloride, tin chloride, titanium chloride, zinc chloride, aluminum diethyl chloride, aluminum ethyl chloride and aluminum diethyl chloride-titanium tetrachloride complex.

2. The process in accordance with claim 1 wherein said dienophile is acrolein.

3. The process in accordance with claim 1 wherein said dienophile is acrylic acid.

4. The process in accordance with claim 1 wherein said dienophile is methyl vinyl ketone.

5. In the process for the production of a substituted cyclohexene wherein a butadiene is reacted with an unsaturated dienophile of the formula

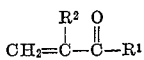

wherein $R^1$ is a member of the group consisting of —H, —OH and lower alkyl and $R^2$ is a member of the group consisting of —H and lower alkyl, the improvement of effecting said reaction at a temperature of from about 20 to about 65° C. in the presence of a catalyst selected from the group consisting of aluminum chloride, tin chloride, titanium chloride, zinc chloride, aluminum diethyl chloride, aluminum ethyl chloride and aluminum diethyl chloride-titanium tetrachloride complex.

6. The process in accordance with claim 5 wherein said dienophile is acrolein.

7. The process in accordance with claim 5 wherein said dienophile is methyl vinyl ketone.

8. In the process for the production of a substituted cyclohexene consisting essentially of cyclohex-1-en-4-al wherein butadiene is reacted with acrolein the improvement of effecting said reaction at a temperature of from about 20 to about 65° C. in the presence of a catalyst consisting essentially of an aluminum diethyl chloride-titanium tetrachloride complex.

References Cited in the file of this patent

UNITED STATES PATENTS

| 2,514,533 | Bloch | July 11, 1950 |
| 2,724,730 | Johnson | Nov. 22, 1955 |
| 2,826,609 | Kamlet | Mar. 11, 1959 |
| 2,879,308 | Pasedach et al. | Mar. 24, 1959 |

FOREIGN PATENTS

| 303,389 | Great Britain | Jan. 1, 1929 |

OTHER REFERENCES

Oddy: "Journal American Chemical Society," vol. 45, pages 2156–2160 (1923).

Norton: "Chemical Reviews," vol. 31, pages 441–445 (1942).